(12) United States Patent
Hsu

(10) Patent No.: US 6,885,706 B2
(45) Date of Patent: Apr. 26, 2005

(54) METHOD FOR PROMOTING TEMPORAL RESOLUTION OF SEQUENTIAL IMAGES

(75) Inventor: Chiun-Wen Hsu, Chia-Yi (TW)

(73) Assignee: Aiptek International Inc., Hsinchu (TW)

( * ) Notice: Subject to any disclaimer, the term of this patent is extended or adjusted under 35 U.S.C. 154(b) by 546 days.

(21) Appl. No.: 10/040,558

(22) Filed: Jan. 5, 2002

(65) Prior Publication Data

US 2003/0128879 A1 Jul. 10, 2003

(51) Int. Cl.[7] .................................................. G04N 7/12
(52) U.S. Cl. .................................................. 375/240.24
(58) Field of Search ................................ 348/452, 459, 348/616, 699; 375/240.12, 240.13, 240.14, 240.15, 240.16, 240.24; 382/232; H04N 7/12

(56) References Cited

U.S. PATENT DOCUMENTS

| | | | | |
|---|---|---|---|---|
| 4,890,160 A | * | 12/1989 | Thomas | 348/699 |
| 5,072,293 A | * | 12/1991 | De Haan et al. | 348/699 |
| 5,089,889 A | * | 2/1992 | Sugiyama | 375/240.12 |
| 5,280,350 A | * | 1/1994 | DeHaan et al. | 348/699 |
| 5,978,047 A | * | 11/1999 | May | 348/616 |
| 6,026,190 A | * | 2/2000 | Astle | 382/232 |
| 2002/0036705 A1 | * | 3/2002 | Lee et al. | 348/459 |
| 2002/0171759 A1 | * | 11/2002 | Handjojo et al. | 348/452 |
| 2003/0086496 A1 | * | 5/2003 | Zhang et al. | 375/240.16 |

* cited by examiner

Primary Examiner—Richard Lee

(57) ABSTRACT

A method for promoting temporal resolution of sequential images is to firstly choose a first visual frame and split it into a plurality of visual blocks according to a predetermined value, then choose a second visual frame. The method then goes to search the second visual frame for mostly resembling respective visual blocks corresponding to every visual block in the first visual frame and estimate the vector displacement of respective corresponding visual blocks of the visual frames. Further, it goes to rebuild a visual frame, estimate the respective pixel values of respective corresponding visual blocks of the visual frames at a time point, combine the pixel values of visual blocks to create the rebuilt visual frame, apply a median-value-filtering procedure upon the rebuilt visual frame, and apply a spatial low-pass filtering procedure upon the rebuilt visual frame, which has undergone the previous procedure.

6 Claims, 4 Drawing Sheets

METHOD FOR PROMOTING TEMPORAL RESOLUTION OF SEQUENTIAL IMAGES

FIELD OF THE INVENTION

This invention relates to a method for promoting temporal resolution of images, particularly to a method that can improve temporal resolution of sequential images by interpolating some images.

BACKGROUND OF THE INVENTION

In the era of multimedia computers and digital communication systems, the speed control technique of bit-stream for signal encoding and transmitting is often referred to digital signal processing (DSP) methods. And in processing digital video signals, sometimes, if not all the times, part of a train of visual frames would be deleted for one reason or another that might degrade the video temporal resolution when playing a video entertainment system for example. More specifically speaking, the visual frames would become discrete in the event of a temporal resolution as low as or even lower than 15 visual frames per second.

For remedy, a temporal interpolation method—a method for interpolating more images between two images by way of motion estimation so as to raise the temporal resolution— is adopted so far though, likelihood of discrete viewing impression still exists if the interpolation images are too far in aberration with their side pictures however.

SUMMARY OF THE INVENTION

The primary object of this invention is to provide a method for promoting temporal resolution of sequential images.

In order to realize above said object, this invention proposes a method for interpolating predictable images in a sequential image train so as to heighten the temporal resolution thereof. The method is firstly to choose a first visual frame in a train of sequential images and spilt it into a plurality of visual blocks according to a predetermined value, then choose a second visual frame in the train of sequential images. The following step is to find a mostly resembling visual block in the second visual frame corresponding to each visual block of the first visual frame, then calculate the vector displacement of corresponding respective blocks in the visual frames. Now, the method is to rebuild a visual frame by utilizing the vector displacement obtained in the previous step and estimate at a time point the pixel value of respective blocks of the first and the second visual frame, and combine them to create the rebuilding visual frame. Finally, such method is supposed to perform a median-value-filtering, procedure then a spatial low-pass filtering procedure upon the rebuilt visual frame.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

As indicated in the flowchart of a method for promoting temporal resolution of sequential images of this invention, the method is firstly to select a first and a second visual frame of a train of sequential images, in which the first visual frame is split into a plurality of visual blocks according to a predetermined pixel value, which is generally equal to 16 pixels*16 pixels.

A first step 11 of the method is to provide pixel data to each visual block of the first and the second visual frame. A second step 12 is to search for a visual block in the second visual frame corresponding to each visual block in the first visual frame according to the input pixel value., and calculate the vector displacement between a pair of correspondent visual blocks in the first and the second visual frame respectively by way of motion estimation shown in FIG. 2. A third step 13 is to estimate the pixel value of each pair of respective corresponding visual blocks in the first and the second visual frame at a time point according to the vector displacement obtained in the previous step 12 and thereby rebuild a new visual frame. A step 14 is a motion assortment step for splitting the visual blocks of the rebuilt visual frame after motion compensation into a first and a second visual block set and for performing a median-value-filtering procedure to the first visual block set. The first visual block set is a visual block set with vector variation when a pair of corresponding visual blocks in the respective first and second visual frame is changed owing to image movement of an article in the visual frames. The second visual block set is a visual block set without vector variation of corresponding visual blocks in the first and the second visual frame, namely, a zero-vector-displacement visual block set. A step 15 is to perform a median-value-filtering procedure when a visual block set is found the first visual block set in step 14. A step 16 is to apply a spatial low-pass-filtering procedure to the first visual block set, which has undergone the median-value-filtering procedure in the previous step, and to the second visual block set that doesn't undergo the step 15. And, a step 17 is to output the new visual frame rebuilt on the basis of the first and the second visual frame.

The foregoing first visual frame might be the current visual frame and the second visual frame might be the previous visual frame.

Figure 1:
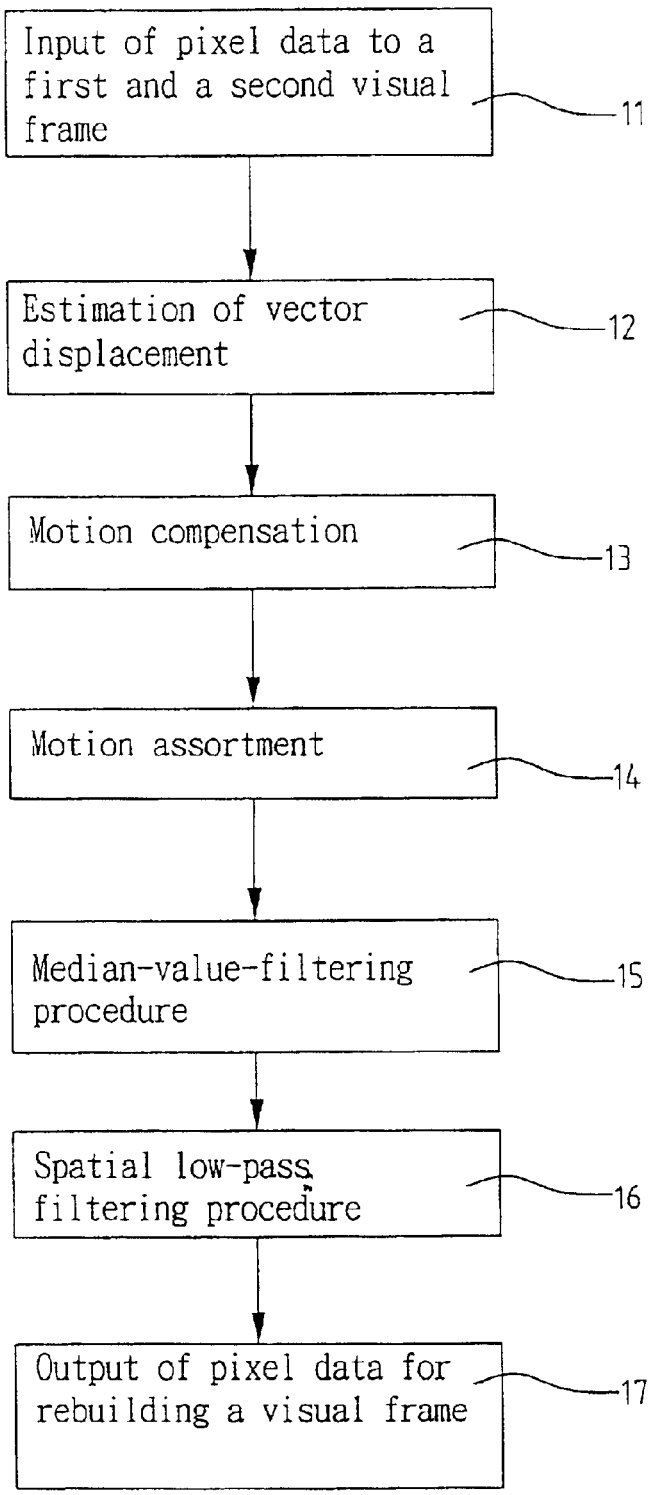
FIG. 1 shows the flowchart of a method for promoting temporal resolution of sequential images of this invention.
Figure 2:
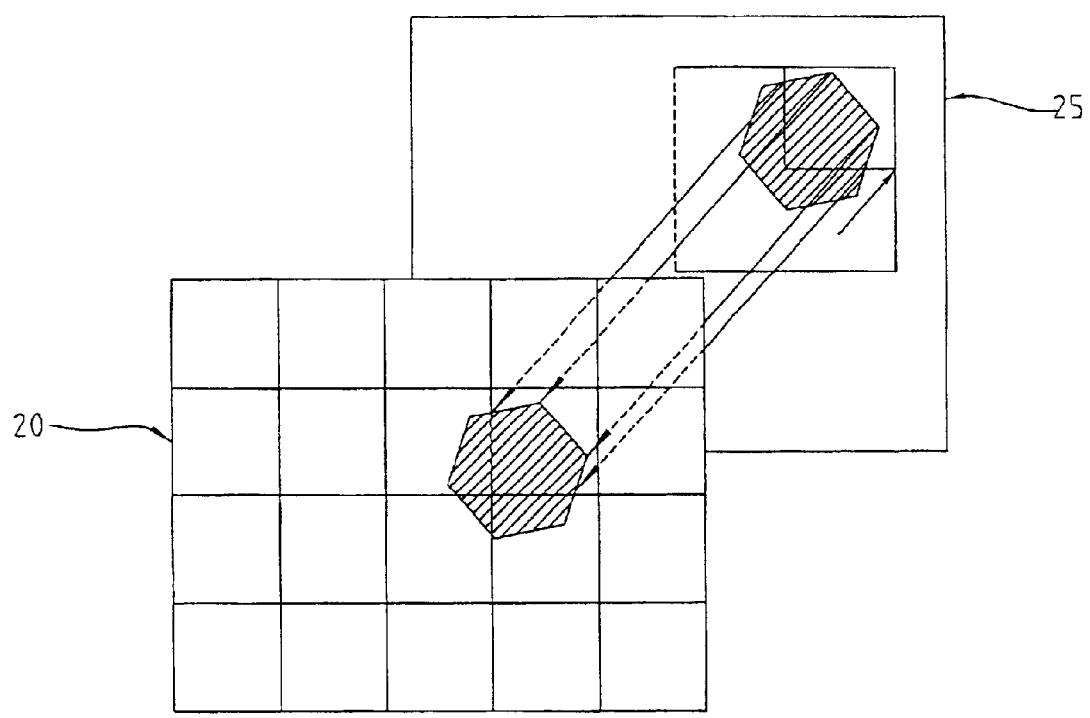
FIG. 2 is a schematic view showing the way of the method of this invention for calculating the vector displacement.

In FIG. 2, which is a schematic view showing the way of the method of this invention for calculating a vector displacement, a visual frame 20 is the current visual frame split into a plurality of visual blocks according to a predetermined value while another visual frame 25 is the previous visual frame. In order to calculate the vector displacement between respective visual blocks in the current and the previous visual frames 20, 25, a pair of corresponding visual blocks in those visual frames must be found and compared firstly.

Figure 3A:
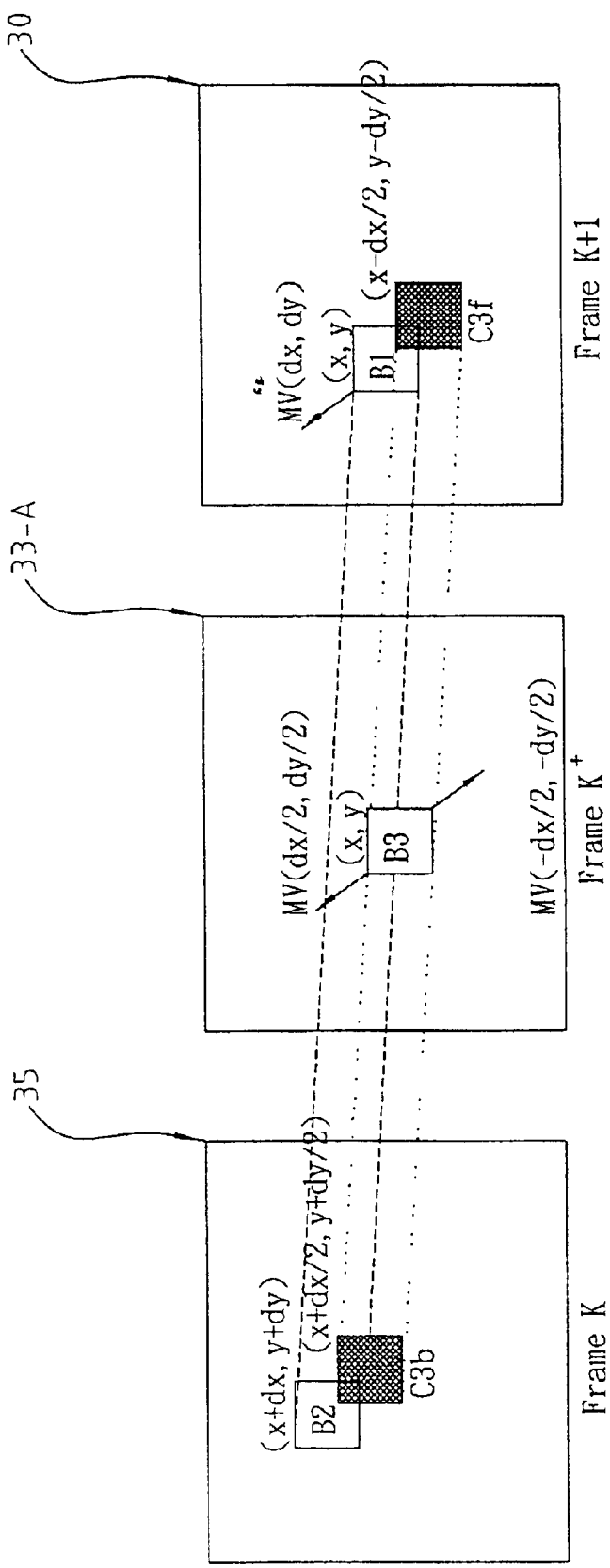
FIGS. 3A and 3B show the way to rebuild visual frames according to the method of this invention.
Figure 3B:
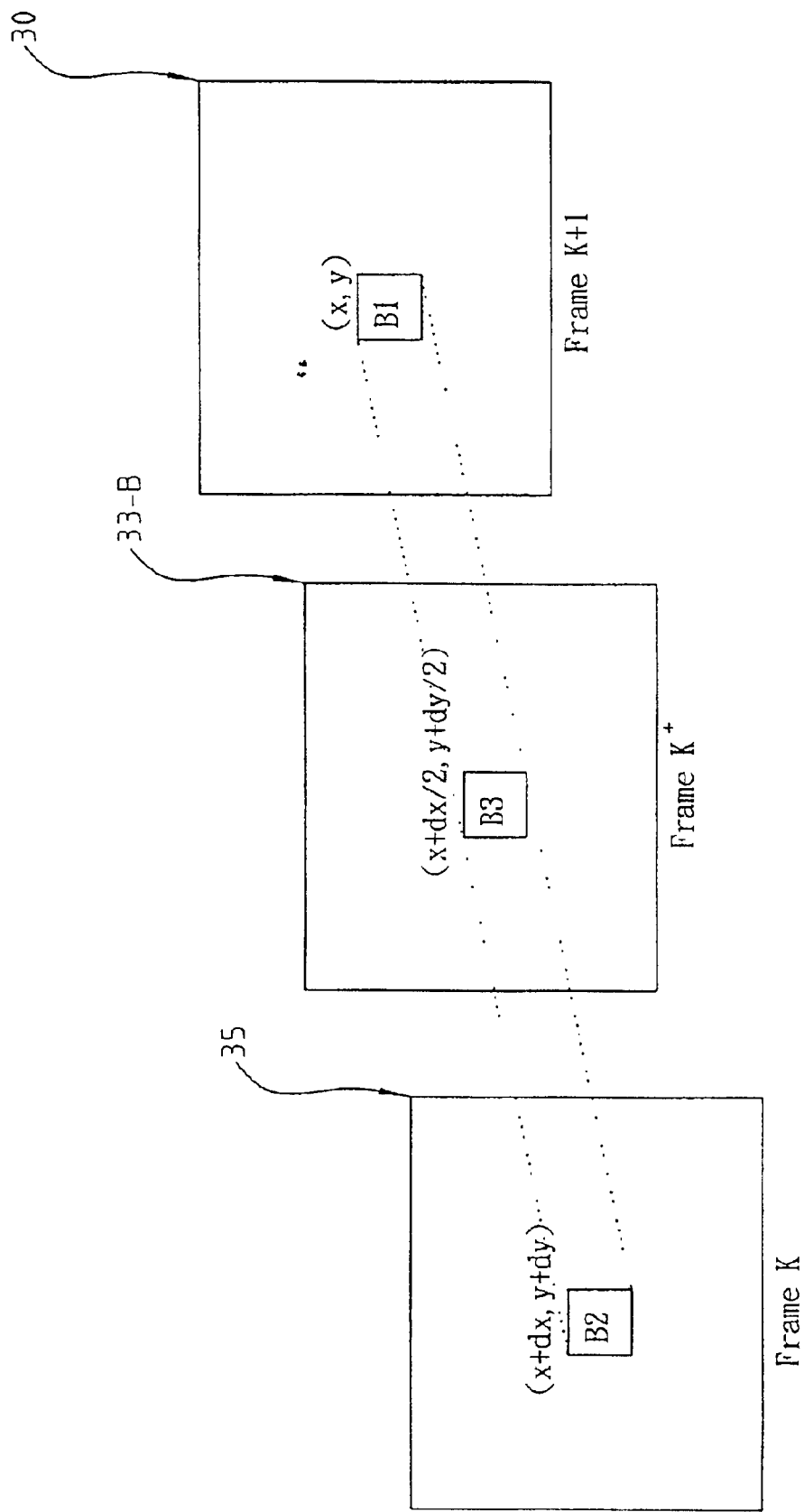

FIGS. 3A and 3B show the way to rebuild visual frames according to the method of this invention. For rebuilding a visual frame, the method is to form firstly a first and a second interpolation visual frame, then try to secure the mean value of pixel data in the interpolation visual frames to be taken as pixel values of the new visual frame.

In FIG. 3A—a schematic view of a method for forming a first interpolation visual frame—a block B1 located at position (x, y) in a first visual frame 30 has a vector displacement (dx, dy) with respect to a second visual frame 35, namely, the block B1 at position (x+dx, y+dy) in the second visual frame 35, i.e., a block B2 in FIG. 3A. Now, assuming a block B3 in a first interpolation visual frame 33-A is located at position (x, y) while at a corresponding position (x+dx/2, y+dy/2) in the second visual frame 35, namely a block C3*b* in FIG. 3A, and at a corresponding position (x−dx/2, y−dy/2) in the first visual frame 30, namely a block C3*f*, then the block B3 may be rebuilt by using the mean value of pixel data in the block C3*b* and C3*f*. Accordingly, the first interpolation visual frame 33-A can be rebuilt in such a manner from block to block of the first and the second visual frames 30, 35.

In FIG. 3B—a schematic view of a method for forming a second interpolation visual frame, a position (x+dx/2, y+dy/2) would rather be considered herein than a block rebuilding position (x, y). The position of the block B1 in a second interpolation visual frame 33-B, namely the position of the block B3, is predictable basing on its moving vector in the first visual frame 30. The pixel data of the block B3 is obtainable according to the mean value of that of the block B1 and the block B2 in the first and the second visual frame 30, 35 respectively.

The method for creating the second interpolation visual frame is more logical with better correctness than that for the first one, however, the pixels therein may generate some rebuilding pixels overlapped or, on the contrary, lack some corresponding interpolation pixels for rebuilding to result in some blank sections in a rebuilt visual frame. For the former case with overlapped pixels, we suggest to calculate and find a mean value for substitution of the pixels, or use the method for forming the first interpolation visual frame for prediction of the pixel values. After the first and the second interpolation visual frame 33-A, 33-B are generated, the method is to calculate the mean value of pixel data in each block of the interpolation visual frames for rebuilding a visual frame, then heighten the image quality by taking advantage of the temporal information.

Since the foregoing method for rebuilding visual frames is incapable of tackling rotation, enlargement, and shrinkage of an article in a train of sequential images effectively, consequently, application of temporal information by performing the median-filtering procedure upon a non-zero-vector-displacement rebuilding block is considered useful for eliminating the unnatural, continuity of the sequential images when replaying. This procedure is to firstly compare the pixel data of corresponding blocks in the first visual frame, the second visual frame, and a rebuilt visual frame so as to take a pixel value of each block set compared as a median value, then perform a mean operation of the median value of each block pixel and the pixel value of each block of the rebuilt visual frame according to the following formula;

NewY+MotCompY+Median (MotCompY, PastY, FutureY))/2 where NewY represents the result obtained from the mean operation of the median value of each block pixel and the pixel value of each block of the rebuilt visual frame; MotCompY represents a rebuilt block produced by the foregoing method; PastY represents the block pixel value in the second visual frame; and FutureY represents the block pixel value of the first visual frame.

The rebuilt visual frame processed by the median-value-filtering procedure is further processed with the spatial low-pass filtering procedure by any of the following formulas:

$$1/16\begin{bmatrix} 1 & 1 & 1 \\ 1 & 8 & 1 \\ 1 & 1 & 1 \end{bmatrix} \text{ or } 1/12\begin{bmatrix} 0 & 1 & 0 \\ 1 & 8 & 1 \\ 0 & 1 & 0 \end{bmatrix} \text{ or } 1/8\begin{bmatrix} 0 & 1 & 0 \\ 1 & 4 & 1 \\ 0 & 1 & 0 \end{bmatrix}$$

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A method for promoting temporal resolution of sequential images, comprising the steps of:
    choosing a first visual frame of a train of sequential images and splitting the first visual frame into a plurality of visual blocks according to a predetermined block size;
    choosing a second visual frame of the train of sequential images;
    searching in the second visual frame for a most resembling visual block corresponding to a visual block in the first visual frame for every visual block in the first visual frame;
    estimating a respective vector displacement of corresponding visual blocks of the first and second visual frames for every visual block;
    rebuilding a visual frame according to the estimated vector displacement and estimating respective pixel values of corresponding visual blocks of the first and second visual frames at a time point for every visual block and combining the estimated pixel values of visual blocks to create a rebuilt visual frame;
    applying a median-value-filtering procedure upon the rebuilt visual frame to create a median-value-filtered visual frame; and
    applying a spatial low-pass filtering procedure upon the median-value-filtered visual frame;
    wherein for each pixel in a visual block of the rebuilt visual frame, the median-value-filtering procedure comprises the steps of;
        comparing pixel values of corresponding pixels of corresponding blocks in the first visual frame, the second visual frame and the rebuilt visual frame to generate a median pixel value; and
        performing a mean operation on the median pixel value and the pixel value of a corresponding pixel in the rebuilt visual frame to generate a pixel value for the median-value-filtered visual frame.

2. The method according to claim 1, wherein the first visual frame is a current visual frame and the second visual frame is a past visual frame previous to the current frame.

3. The method according to claim 1, wherein the step of rebuilding a visual frame comprises:
    creating a first interpolation visual frame based on a vector displacement estimation of corresponding visual blocks in the first interpolation visual frame and the first visual frame and a vector displacement estimation of corresponding visual blocks in the first interpolation visual frame and the second visual frame to generate pixel values of every visual block in the first interpolation visual frame;
    creating a second interpolation visual frame based on a mean pixel value of corresponding pixel values of corresponding visual blocks in the first and second visual frames for every pixel in every visual block to generate pixel values; and performing a mean operation on the pixel values of respective corresponding pixels in the first and second interpolation visual frames to generate pixel values for the rebuilt visual frame.

4. A method for promoting temporal resolution of sequential images, comprising the steps of:

choosing a first visual frame of a train of sequential images and splitting the first visual frame into a plurality of visual blocks according to a predetermined block size;

choosing a second visual frame of the train of sequential images;

searching in the second visual frame for a most resembling visual block corresponding to a visual block in the first visual frame for every visual block in the first visual frame;

estimating a respective vector displacement for corresponding visual blocks of the first and second visual frames for every visual block;

rebuilding a visual frame according to the estimated vector displacement and estimating respective pixel values in a visual block of corresponding visual blocks of the first and second visual frames for every visual block at a time point and combining the estimated pixel values of visual blocks to create a rebuilt visual frame;

dividing visual blocks of the rebuilt visual frame into a first block set including visual blocks having non-zero estimated vector displacements and a second block set including visual blocks having zero estimated vector displacements;

applying a median-value-filtering procedure upon the first block set of the rebuilt visual frame and copying the second black set of the rebuilt visual frame to create a median-value-filtered visual frame; and applying a spatial low-pass filtering procedure upon the median-value-filtered visual frame;

wherein for each pixel in a visual block of the first block set of the rebuilt visual frame, the median-value-filtering procedure comprises the steps of:

comparing pixel values of corresponding pixels of corresponding blocks in the first visual frame, the second visual frame and the rebuilt visual frame to generate a median pixel value; and performing a mean operation on the median pixel value and the pixel value of a corresponding pixel in the rebuilt visual frame to generate a pixel value for the median-value-filtered visual frame.

5. The method according to claims 4, wherein the first visual frame is a current visual frame and the second visual frame is a past visual frame previous to the current frame.

6. The method according to claim 4, wherein the step of rebuilding a visual frame comprises:.

creating a first interpolation visual frame based on a vector displacement estimation of corresponding visual blocks in the first interpolation visual frame and the first visual frame and a vector displacement estimation of corresponding visual blocks in the first interpolation visual frame and the second visual frame to generate pixel values of every visual block in the first interpolation visual frame;

creating a second interpolation visual frame based on a mean pixel value of corresponding pixel values of corresponding visual blocks in the first and second visual frames for every pixel in every visual block to generate pixel values; and performing a mean operation on the pixel values of respective corresponding pixels in the first and second interpolation visual frames to generate pixel values for the rebuilt visual frame.

* * * * *